(12) United States Patent
Sailer et al.

(10) Patent No.: US 7,117,335 B2
(45) Date of Patent: Oct. 3, 2006

(54) METHOD OF AND APPARATUS FOR CONTROLLING OF REGULATING INDUSTRIAL PROCESSES

(75) Inventors: Alexander Sailer, Goeggingen (DE); Martin Merz, Fichtenberg (DE); Albrecht Schindler, Aspach (DE); Thorsten Klepsch, Aspach (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/957,041

(22) Filed: Oct. 1, 2004

(65) Prior Publication Data

US 2005/0075742 A1    Apr. 7, 2005

(51) Int. Cl.
G06F 12/00 (2006.01)
G06F 12/14 (2006.01)
G06F 12/16 (2006.01)
G06F 13/00 (2006.01)
G06F 13/28 (2006.01)

(52) U.S. Cl. ............... 711/173; 711/104; 711/132; 711/133; 711/136; 711/153; 714/5; 710/23; 710/53; 710/56; 709/215; 700/87

(58) Field of Classification Search ............... 700/87; 709/212–216; 710/22, 23, 52, 53, 55, 56; 711/5, 100, 101, 104, 117–136, 147, 148, 711/153, 170–173; 714/5–8
See application file for complete search history.

(56) References Cited

U.S. PATENT DOCUMENTS 5,761,220 A * 6/1998 Zook .................. 714/764
5,793,774 A * 8/1998 Usui et al. ............... 714/719
6,449,709 B1 * 9/2002 Gates ...................... 712/202
6,711,059 B1 * 3/2004 Sinclair et al. ........ 365/185.11
6,714,041 B1 * 3/2004 Darling et al. ............. 326/38
6,715,000 B1 * 3/2004 Cheung et al. ............ 710/28
6,731,607 B1 * 5/2004 Mantin ..................... 370/254
6,751,155 B1 * 6/2004 Gorobets ............... 365/230.09
6,851,621 B1 * 2/2005 Wacker et al. ............. 236/51
6,941,413 B1 * 9/2005 Baba ....................... 711/104
2004/0049727 A1 * 3/2004 Wang ........................ 714/766
2004/0143695 A1 * 7/2004 Hashimoto et al. .......... 711/1

FOREIGN PATENT DOCUMENTS

| JP | 11136619 A | * 5/1999 |
| JP | 2001273197 A | * 10/2001 |
| JP | 2001318836 A | * 11/2001 |

* cited by examiner

Primary Examiner—Crystal J. Barnes
(74) Attorney, Agent, or Firm—Michael J. Striker

(57) ABSTRACT

A method of controlling an industrial process by a programmable process control has the steps of taking data in form of resulting values which are decisive for the process, storing the data in a storage of a programmable process control, during starting a control program reading pre-defined configuration data which are stored in a storage in the control and connected with a control program, based on the configuration data selecting a subset of the resulting values adapted to a resulting value storage available in the control, and subsequently storing it in this storage.

9 Claims, 4 Drawing Sheets

METHOD OF AND APPARATUS FOR CONTROLLING OF REGULATING INDUSTRIAL PROCESSES

BACKGROUND OF THE INVENTION

The present invention relates to a method of and an apparatus for controlling and/or regulating of an industrial process by means a programmable process control.

Industrial controls operate with shorter cycle times, and the data quantities which must be managed increase correspondingly. For testing the quality of a process the data are taken online in real time, stored in fast storage, and subsequently evaluated. When the process is repeated in fast cycle, it always happens that the fast data storage (RAM) of the control is not sufficient to protect all resulting values of the process. In this case data are lost unintentionally. The quality of statistic evaluation of the data therefore suffer and subsequently also the quality of the process.

SUMMARY OF THE INVENTION

Accordingly, it is an object of the present invention to provide a method of and apparatus for controlling and/or regulating an industrial process, which provides a better capacity use and in particular a better efficiency of the corresponding control and/or regulation systems.

In keeping with these objects and with others which will become apparent hereinafter, one feature of the present invention resides, briefly stated, in a method of controlling an industrial process, in which during starting a control program, predefined configuration data stored in a storage of the control and connected with the control program are read, and based on these configuration data a subset of resulting values adapted to resulting value, storage available in the control, is selected and subsequently stored in this storage.

In accordance with another feature of the present invention an apparatus is proposed with a process control which is connected with at least one operating device through a communication interface or a bus system, wherein the configuration data contained in the storage of the process control can be changed via the operating device by an operating program provided for this purpose.

When the method for controlling and/or regulating an industrial process with a programmable process control is performed in accordance with the present invention, the data in the form of resulting values which are decisive for the process are taken and stored in the storage of a programmable process control provided for this purpose. During starting a program, the predefined configuration data which are connected with the program are read from a data table stored in the storage of the control, and based on these configuration data a subset of the resulting values, adapted to the resulting value storage available in the control, is selected and subsequently stored in this storage. The method makes possible the optimized use of the available data storage of the control and prevents that the data are unintentionally lost, so as to increase the efficiency of the prescription process.

Preferably, the configuration data are stored in a flash storage which is slower but for this purpose cheaper and before the beginning of the process are read "offline", and the system is adjusted correspondingly. The configuration data are subjected preferably to a CRC testing to avoid errors in the configuration phase and to store the received resulting values in SRAM. Preferably the SRAM-battery is buffered, for avoiding data losses, for example because of power failure. The device can be drawn from the network over longer time without losing the data of the last course.

For adapting the available storage to the process, it is proposed to define the storage as a ring storage or stack. The advantage is that the storage can be configured in accordance with the cycle time and repetition rate, that the desired process data are automatically canvassed.

Preferably, it is also provided that the program-specific data can be stored in form of text strings, or in other words in the configuration data both numerical elements and also text elements can be predefined.

For adapting the control to the requirements of all system users it is proposed that the user or users can adapt the configuration data by software application provided for this purpose, to their requirements. This functionality increases the flexibility of the system and minimizes the demand for expensive, battery-buffered data storage.

Preferably, in accordance with the present invention a control, for example a screwing control, is provided with a communication bus system and an HMI (human machine interface) connected with the bus system. The configuration data and the control can be adapted themselves by the HMI to the requirements of the user and to the process. Thereby it is also provided that the company merchandise updates can be transmitted by the HMI to the control.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
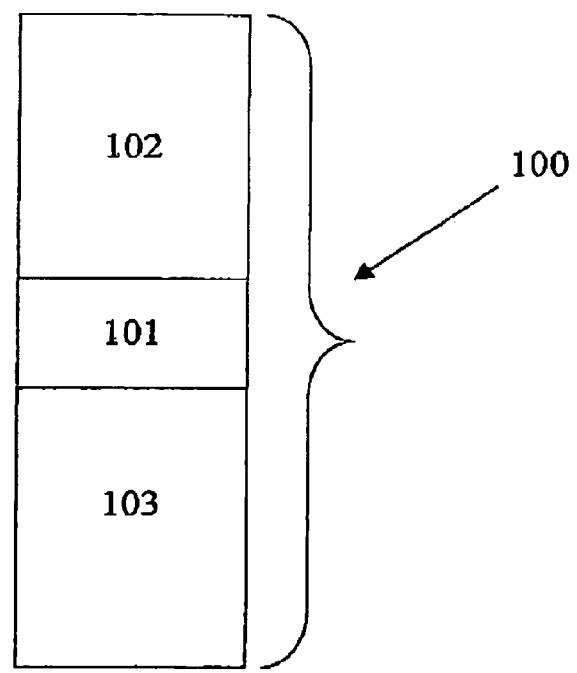
FIG. 1 is a view schematically showing a storage of a control in accordance with the present invention.

For understanding of the invention, substantial elements and components are represented in the drawings schematically. Same or identically operating components are identified with the same reference numerals.

FIG. 1 schematically shows regions 101, 102, 103 of a SRAM storage of a screwing control. The storage block as a whole is of a size 125 KB and the region 101 providing the resulting values is of a size 100836 bytes. The size of the regions can be adjusted by software service tools "offline", wherein an "online" adjustment is also possible in principle. The regions 103 below and 102 above the result storage region 101 are reserved for other system functions.

The region 101 can be configured as a stack or a ring storage. In other words the storage 101 can be written either with resulting values until the region 101 is full and then all further resulting values are not stored, or all data can be progressively overwritten. The adjustment, whether of a ring or a stack, depends on the process.

Figure 4:
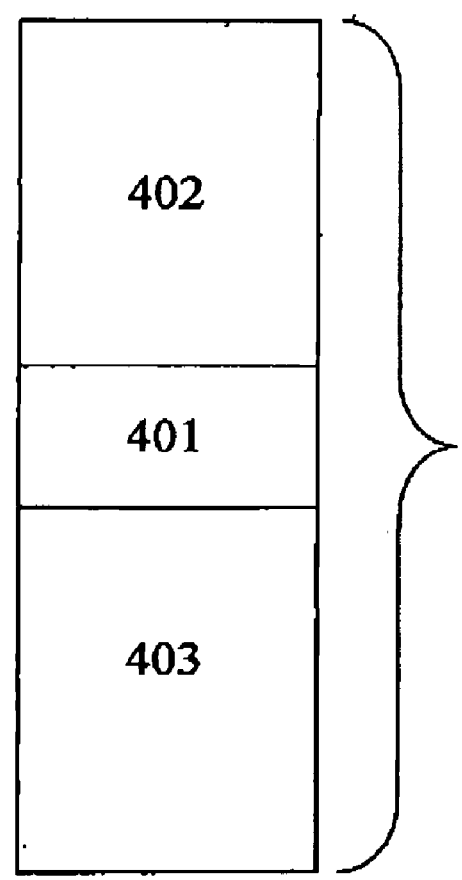
FIG. 4 is a view schematically showing a flash for storage of the control in accordance with the present invention.

FIG. 4 provides a schematic showing of the regions 401, 402, 403 of a FLASH storage of a screwing control. The storage block as a whole is of a size 1 MB and the region 401 provided for the configuration data has a size of 746 bytes.

The content of the region 401 can be changed "offline" by software service tools, wherein an "online" adjustment is also possible in principle. The region 403 below and the region 402 above the result storage region 401 are reserved for other system functions.

Figure 3:
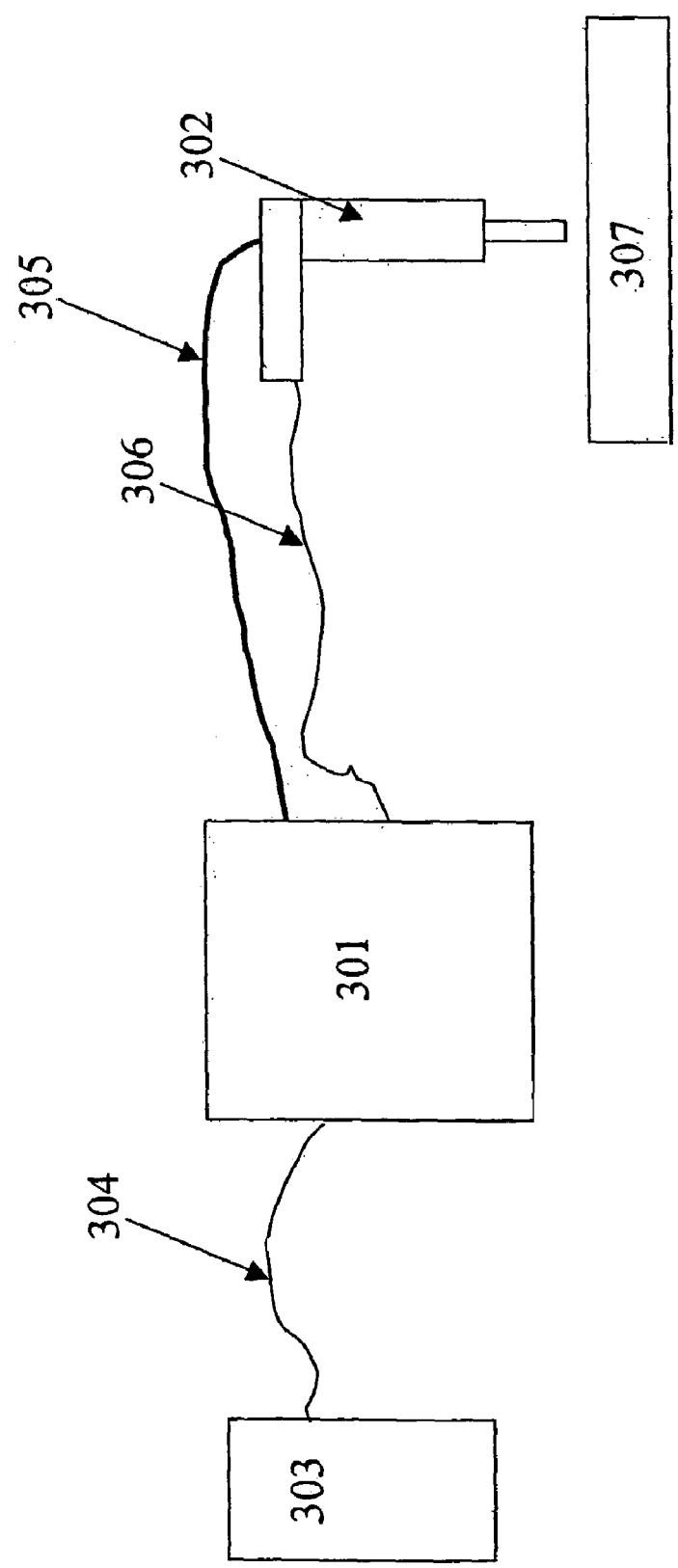
FIG. 3 is a view showing a process control in accordance with the present invention.

FIG. 3 schematically shows a screwing process, including the process control 301, HMI 303, screwing device 302 and workpiece 307. The screwing device is connected to the process control through a communication interface 306 and a power connection 305. The power connection 305 can be electrical or pneumatic, depending on the type of the screwing device 302. The communication interface 306 is formed preferably bi-directional. The screwing device 302 is provided with several sensors, for example torque sensors, encoders, rotary transmitters and/or pressure sensors, which during the screwing process receive data and transmit the data to the control 301.

The data, based on the configuration available in the configuration storage 401, are filtered, and the desired variables are stored in the SRAM 101. The stored data can be evaluated by the screwing control 301, or can be transmitted to a further control. The further control can be connected either to the data bus 304 or to a further data busus or to a further network such as a Ethernet LAN.

The screwing control 301 is connected with an HMI 303 through the data bus 304. The HMI can be a simple device or a very powerful PC based device. The HMI 303 is mainly used, depending on the computer power and storage capacity, for taking the process control 301 into operation, and for analyzing, adjusting and/or optimizing process parameters. A service software tool is installed on the HMI 303, that allows the system user to adapt the configuration data to the requirements of the process. When the HMI 303 is a PC based device, the software tool has a graphic surface which allows the user to obtain a simple grasp of the process data. By means of several GUI's, the desired storage configuration can be graphically adjusted. The nature of the adjustment subsequently can be interpreted by the software tool, and the relevant commands can be transmitted to the control 301.

Figure 2:
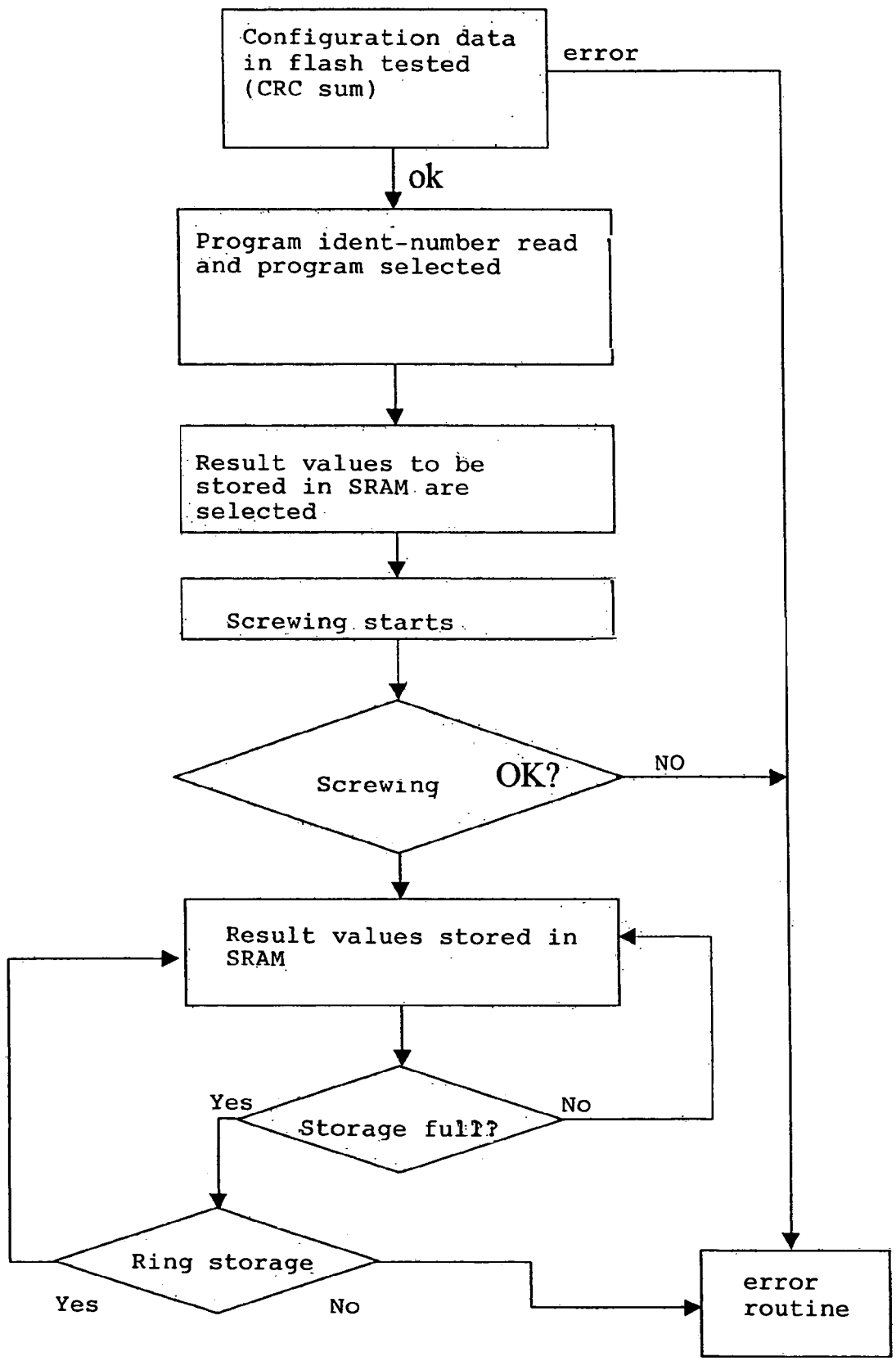
FIG. 2 is a view showing a software flow chart of one implementation of the present invention.

FIG. 2 shows a flow chart of the resulting data-storage process, wherein first the configuration data are examined in the flash via CRC sum for integrity in the storage. The configuration data contain informations, during starting which programs store which result values in the SRAM 100 of which type.

During starting, 48 programs are available for selection (0–47) one program for releasing the screwing. Each bit is provided for a selected program, Bit 0/Prg0, Bit1/Prg1, etc, special case Bit 63/Prg99 (releasing).

The user, from all available resulting values can select the different documentation stages and result stages, which resulting values he can store in the SRAM 100. It can store maximum 20 general informations. These are data which are program-specific, such as for example ID code, program number and etc. For each information there is a definite resource ID. When it is available in the configuration, the corresponding variable is stored in the result storage 101. With sign chains, such as for example the program names, the user based on the start and stop values can also store only a part of the sign change. Moreover, the required place for the resource ID is provided. For screwing data, such as for example moment, angle and gradient, for each stage a place is available for maximum 80 different resources-ID's. The stages number is limited to 4. This corresponds to the result stage and up to three documentation stages, which the user can freely select in the screwing program. The "value" corresponds to the storage demand in bytes for the selected resource ID.

The storage 101 can be used as a stack, in which always the data are stored. When the SRAM 101 is used, no further screwing data are secured.

The second type is to use the storage 101 as a ring storage. Here the data are written always in the SRAM 101. If this is desired, the oldest data in the SRAM 101 can be overwritten.

The resulting data are stored in dependence on the configuration data in the SRAM 101. This has the advantage that only the data in the SRAM 101 are stored, which are of interest for the user.

The process during a screwing is as follows:
Starting a screwing;
After the evaluation of the screwing by the hardware (signals of the operational means control, such as for example OK, NOK, angle too high, . . . ), the result data are transmitted into the SRAM 101. The volume of the data written in the SRAM 101 depends on the configuration data, which are stored in the flash 401.

It will be understood that each of the elements described above, or two or more together, may also find a useful application in other types of methods and constructions differing from the types described above.

While the invention has been illustrated and described as embodied in method of and apparatus for controlling or regulating industrial processes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of controlling an industrial screwing process by a programmable screwing process control, comprising the steps of taking data in form of resulting values corresponding to screwing data, which are decisive for the industrial screwing process; storing the data in a storage of a programmable process control; during starting a control program reading predefined configuration data, said configuration data containing information as to types of resulting values that are stored in the control program in a resulting value storage, wherein said configuration data are stored in a storage in the programmable screwing process control and connected with the control program; based on the configuration data selecting a subset of the resulting values adapted to the resulting value storage available in the programmable process screwing control, wherein said resulting value storage is configured as a stack or ring storage depending on the industrial screwing process; and subsequently storing the subset of the resulting values in the stack or ring storage.

2. A method as defined in claim 1; and further comprising storing the configuration data in a flash.

3. A method as defined in claim 2; and further comprising examining the configuration data by a CRC sum to an integrity.

4. A method as defined in claim 1; and further comprising storing the resulting values in an SRAM.

5. A method as defined in claim 4; and further comprising using as the SRAM an element selected from the group consisting of a ring storage and a stack.

6. A method as defined in claim 1; and further comprising storing predefined program-specific data.

7. A method as defined in claim 1; and further comprising modifying the configuration data.

8. A method as defined in claim 1; and further comprising providing the resulting values corresponding to screwing data.

9. An apparatus for implementing a method including the steps of taking data in form of resulting values which are decisive for the method, storing the data in a storage of a programmable process control, during starting a control program reading pre-defined configuration data said configuration data containing information as to types of resulting values that are stored in the control program in a resulting value storage, wherein said configuration data are stored in a storage in the programmable process control and connected with a control program; based on the configuration data selecting a subset of the resulting values adapted to a resulting value storage available in the programmable process control, and subsequently storing the subset of the resulting values in the storage, the apparatus comprising a process control; at least one operating device connected with said process control through an element selected from the group consisting of a communication interface and a bus system, said process control having a storage which contains configuration data which are changeable via said operating device by an operation program provided therefore, and wherein said programmable process control is a screw control.

* * * * *